UNITED STATES PATENT OFFICE.

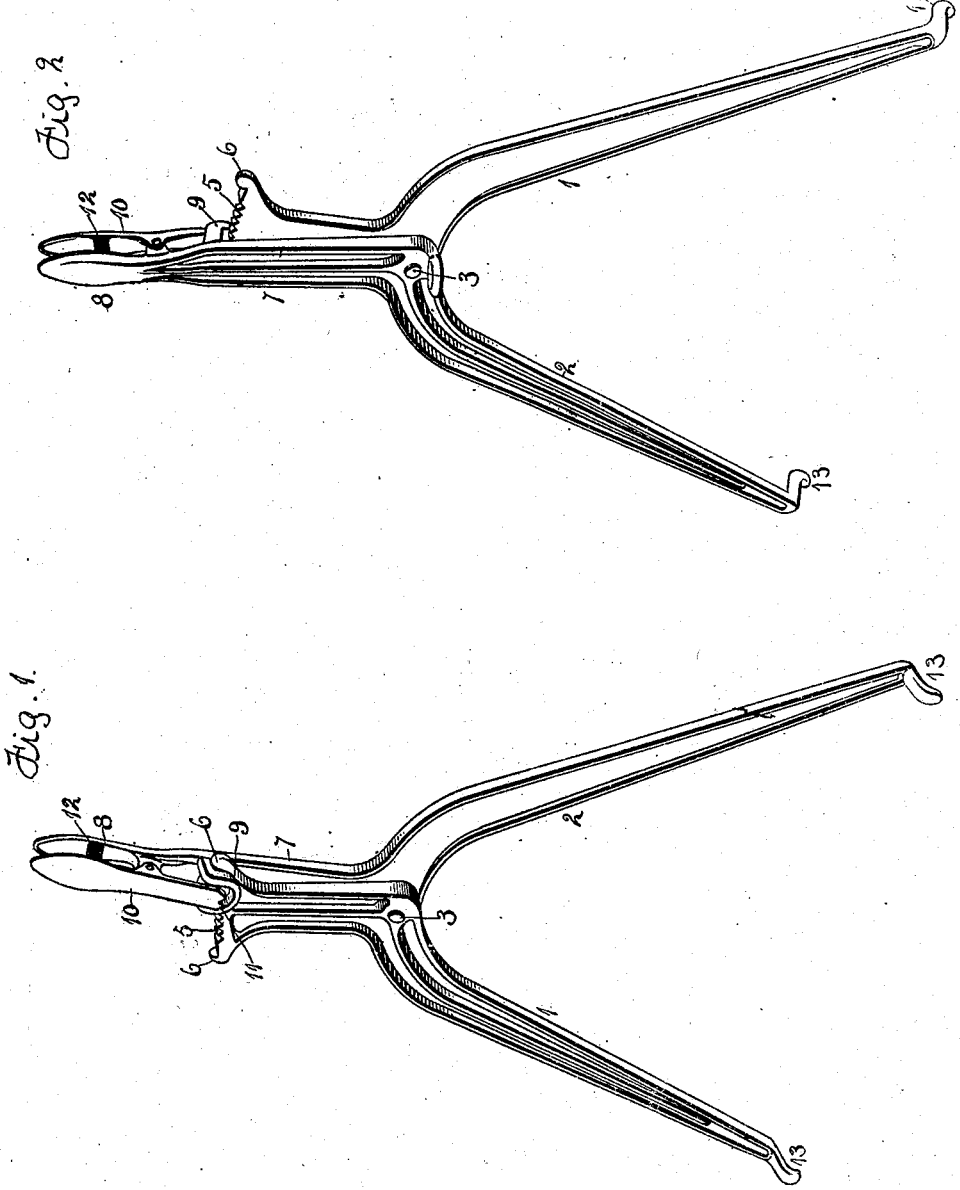

LEWIS E. WATERMAN, OF ROCKFORD, ILLINOIS, ASSIGNOR TO EMERSON MANUFACTURING COMPANY, OF ROCKFORD, ILLINOIS, A CORPORATION OF ILLINOIS.

BAIL FOR CULTIVATORS.

No. 894,788.　　　　Specification of Letters Patent.　　　Patented July 28, 1908.

Application filed February 19, 1907. Serial No. 358,209.

*To all whom it may concern:*

Be it known that I, LEWIS E. WATERMAN, a citizen of the United States, residing at Rockford, in the county of Winnebago and State of Illinois, have invented certain new and useful Improvements in Bails for Cultivators, of which the following is a specification.

The object of this invention is to construct a bail for cultivators in which the sections composing the bail are readily adjustable in connection with each other in order that the beams of the cultivator may be held the proper distance apart.
In the accompanying drawings, Figure 1 is a perspective view of the bail as seen from one face. Fig. 2 is a perspective view of the bail as seen from the other face.

The bail is composed of the two branches 1 and 2 pivoted together at the point 3. The branch 1 has an upturned extension 4 which is provided with a series of teeth 5 and two end projections 6. The branch 2 has an upturned extension 7 terminating in a handle 8.
From the extension 7 projects a lip 9 which overhangs the teeth 5 of the branch 1. To the handle 8 is pivoted a thumb-latch 10 having its lower end formed with teeth 11 fitted to engage the teeth 5 of the branch 1 and is located between the branches of the lip 9 which holds it from lateral movement. A spring 12 is located between the thumb-latch 10 and the handle 8 and serves to hold the teeth of the thumb-latch in engagement with the teeth of the branch 1.

The lower ends of the branches 1 and 2 are formed with hooks 13. The hooks 13 are placed in engagement with the beams of a cultivator. By pressing the thumb-latch 10 the teeth 11 carried thereby will be moved free of the teeth 5 of the branch 1, when the branches can be moved on the pivot connecting them, and when adjusted, the thumb-latch 10 is released which will permit the teeth thereof to engage the teeth of the branch 1 thereby connecting the branches.

The projections 6 prevent the separation of the branches of the bail by the lip 9 coming in contact with the projections. As the thumb latch has its lower end located within or between the branches of the forked lip 9, the lower end of the latch is held against lateral movement, thereby removing the strain from the pivotal connection thereof.

I claim as my invention.

A bail for cultivators comprising two branches pivotally connected, each branch having an upturned extension, one extension provided with teeth, the other extension continuing beyond the teeth and having a forked lip overlapping the teeth, a thumb latch pivotally connected with the last mentioned extension and located wholly beyond the teeth, and located within the forked lip and having its lower end provided with teeth, and a spring for holding the teeth of the thumb latch in engagement with the teeth of the extension.

LEWIS E. WATERMAN.

Witnesses:
　A. O. BEHEL,
　E. BEHEL.